United States Patent
Kenney

[11] 3,810,278
[45] May 14, 1974

[54] CONVEYOR BELTS
[75] Inventor: Michael J. Kenney, Sutton Coldfield, England
[73] Assignee: Dunlop Limited, London, England
[22] Filed: Apr. 11, 1972
[21] Appl. No.: 242,967

[30] Foreign Application Priority Data
Apr. 16, 1971  Great Britain .................. 09676/71
Mar. 1, 1972   Great Britain .................. 09442/72

[52] U.S. Cl. .............................. 24/31 W, 74/231 J
[51] Int. Cl. ............................................. F16g 3/08
[58] Field of Search ..... 24/31 B, 31 H, 31 W, 31 R, 24/31 C, 38; 74/231 J

[56] References Cited
UNITED STATES PATENTS
2,449,950  9/1941   Nassimbene ..................... 24/31 W
2,265,604  12/1941  Knoedler .......................... 24/31 C
3,546,054  6/1968   Ross ................................. 74/231 J FOREIGN PATENTS OR APPLICATIONS
328,995   7/1903   France .............................. 24/31 B
163,925   2/1949   Germany ........................... 24/31 W
712,116   7/1954   Great Britain .................... 74/231 J
720,017   12/1954  Great Britain .................... 74/231 J Primary Examiner—Bobby R. Gay
Assistant Examiner—Kenneth J. Dorner
Attorney, Agent, or Firm—Stevens, Davis, Miller & Mosher

[57] ABSTRACT

A belt coupling means comprising first abutment means secured or adapted to be secured to one end of the belt, second abutment means secured or adapted to be secured to the other end of the belt or an end of another belt, and a tie-bar which is engageable with the first and second abutment means, the abutting surfaces of the abutment means and the tie-bar having inter-locking configurations such that when the belt is in tension the coupling means is held together. This coupling means presents a quick and relatively inexpensive method by which belts, particularly wire reinforced belts, may be joined on site, with little effect on the overall strength of the belt, of which the following is a specification.

8 Claims, 12 Drawing Figures

CONVEYOR BELTS

The present invention relates to conveyor belts and in particular coupling means for conveyor belts.

Conveyor belts are usually made as long lengths of belt, the ends of which are usually joined together on site to make a continuous band. Hitherto two methods have generally been used to joint conveyor belts, these being (1) to staple fasteners through the fabric carcass at the ends to be joined, the fasteners being held together by a metal pin or rod, or (2) the ends of the belt are delaminated to expose the carcass fabrics which are then splice joined and the belt revulcanized to form a strong invisible joint.

Although these methods both give good results they both suffer from certain defects. For instance the stapled joint, although very quick and inexpensive to fit requiring a minimum of skill, possess only a fraction of the strength of the fabric carcass to which it is attached and because of this it is necessary to increase the strength of the carcass of the whole belt to achieve the required strength for the joint. Also this type of joint cannot be used where it is important to have a continuous surface on the belt.

The method of splicing the joint and remoulding the surface produces an excellent joint that can be made as strong as the belt carcass and can be made with a continuous surface. However, this method requires a considerable amount of manual skill, heavy vulcanizing equipment and a considerable amount of time to complete. This is not so bad if the joint is to be made in the manufacturing factory; however, for joints made on site this method becomes extremely expensive.

According to one aspect of the present invention a belt-coupling means comprises first abutment means secured or adapted to be secured to one end of a belt, second abutment means secured or adapted to be secured to the other end of the belt or an end of another belt, and a tie-bar which is engageable with the first and second abutment means, the abutting surfaces of the abutment means and the tie-bar having interlocking configurations, these being such that when the belt is in tension the coupling means is held together.

Conveniently, the first and/or second abutment means comprise one or more abutment elements secured or adapted to be secured to one end of a belt by at least one connecting element which is flexible in at least one direction.

According to one aspect of the present invention a belt comprises a belt carcass to each end of which is securely attached abutment means, the abutment means being positioned and shaped so that the abutment means at one end of the belt may be coupled to the corresponding abutment means at the other end of the belt or at the end of another belt, by means of a tie-bar, the abutting surface of the abutment means and the tie-bar having interlocking configurations such that when the belt is in tension the coupling means is held together.

The connecting elements used to secure the abutment means to the belt carcass may be wires, cords fabric materials (e.g., textile or wire), flexible perforated metal plates, or any other type of reinforcement material which will not adversely affect the longitudinal flexibility of the belt to any great extent.

The abutment elements may be one or more bars which are held a uniform distance away from the end of the belt carcass, by means of the connecting elements. Such a bar or set of bars may be in the form of a continuous bar spanning substantially the whole width of the belt or, for example, where the connecting elements used are wires a set of bars may be made up of individual nipples attached to each wire.

Where abutment means of the type described above are used, the spacing of the bar or set of bars from the belt carcass should be sufficient to accommodate a flange which forms part of the tie-bar.

Alternatively a bar may be attached flush with the belt carcass end, and grooves provided in the bar into which the flange of the tie-bar may engage.

The tie-bar preferably consists of two plates which may be fastened together by means of screws or other fastening means. Each plate being provided with at least two parallel flanges which are adapted to fit between the belt carcass and the abutment means or to engage with the grooves provided in the abutment means each flange engaging with the abutment means associated with one of the two belt ends to be connected.

The abutting surfaces of these flanges and the abutment elements have interlocking configurations which, when the coupling is under tension, will retain the abutment elements in position or even tend to force the abutment means together, for example the abutting surfaces may be "V" and wedge shaped, cylindrically concave and convex or may have locating lugs and grooves.

For ease of production these abutment elements with shaped surfaces may be in the form of shaped collars or bars through which one or more connecting elements may pass. The collars or bars being retained on the connecting elements by means of swaged nipples. These nipples may either abut the end surface of the collar or bar or may be recessed below the surface.

As stated above the abutment means may be flush to the end of the belt carcass in which case it may be sealed thereto to prevent ingress of dirt, water or other corrosive material into the joint.

If the abutment means is separated from the end of the belt carcass, the ends of the belts and the tie-bars may be so shaped that the tie-bars also clamp into the ends of the belt thus forming a seal between the tie-bar and the belts.

The coupling devices of this invention may be positioned flush with the surface of the belt, and where a continuous surface is required the outer surface of the tie-bar may be of the desired shape, e.g., ribbed. Alternatively the coupling may be recessed below the surface of the belt so that it may be covered by an insert of the belting material.

The coupling devices disclosed so far are ideally suitable for use with transversely rigid belts as the tie-bars and abutment means will normally be made of metal although other materials may be used depending on the strength of joint required.

However, the coupling devices may equally well be used with belts that are transversely flexible, provided the abutment means and tie-bars are made flexible. This may be done by using sets of bars (for example a series of nipples as described above) or using continuous bars and tie-bars which are divided into segments connected by or embedded in flexible material for example rubber.

The invention will now be described with reference to the accompanying drawings in which.

Figure 1:
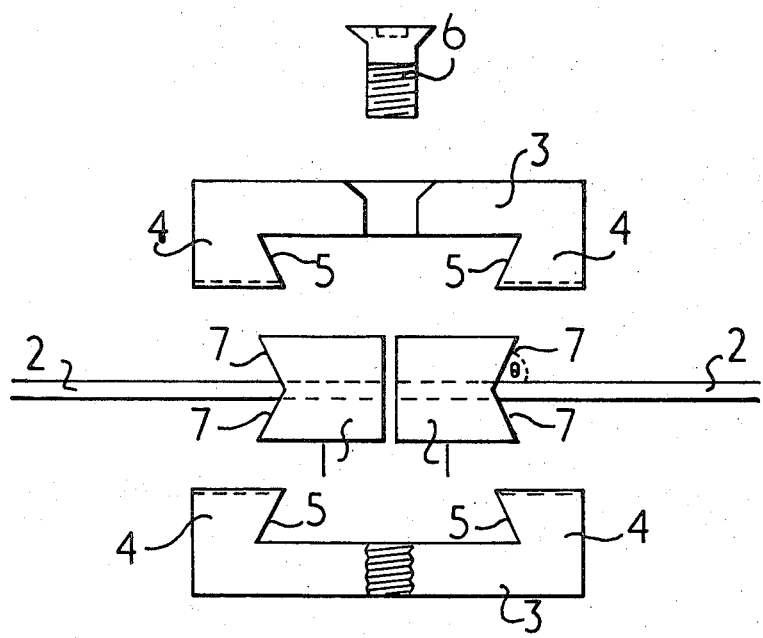
FIG. 1 shows an exploded elevation of one embodiment of the coupling device of the present invention.
Figure 2:
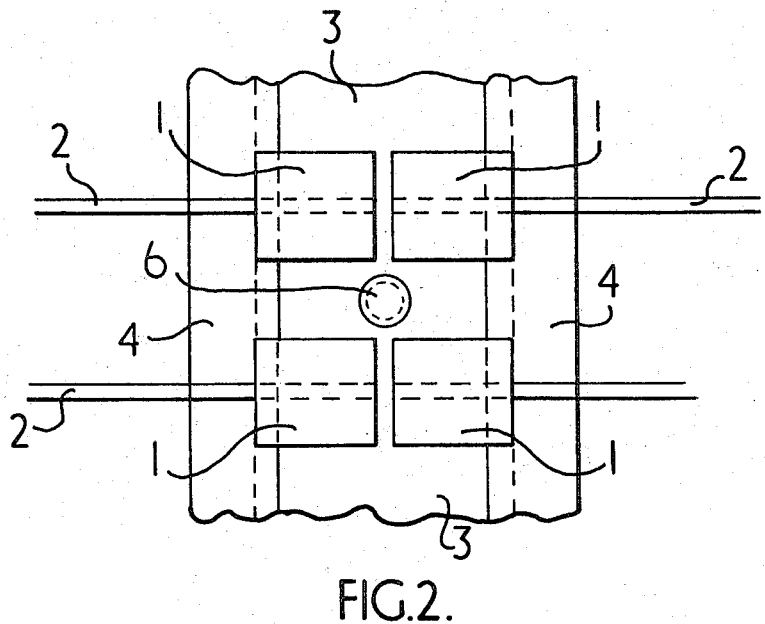
FIG. 2 shows a plan of the embodiment of the invention shown in FIG. 1, with the upper plate of the tie-bar removed.

The embodiment of the invention shown in FIGS. 1 and 2 comprises two sets of nipples 1 which are securely attached to the ends of wires 2. The wires being inserted and bonded into the ends of the belt carcasses to be joined so that the sets of nipples 1 are accurately held a fixed distance from the end of the belt carcasses. The two carcass ends to be joined are brought together and two plates 3 with parallel flange 4 which constitute the tie-bar are clamped over the wires 2 and nipples 1, so that when the coupling device is under tension the surfaces of the nipples adjacent to the belt carcass abut the inner surfaces of the flange 4 on the tie-bars. These abutting surfaces are "V" shaped on the nipples 1 and wedge shaped on the tie-bar inner surface 5 so that when the coupling device is in tension the plates 3 of the tie-bar are clamped together.

At intervals across the belt spaces are left between the nipples to enable screws to pass between the plates 3 and thereby locate them in position.

Figure 3:
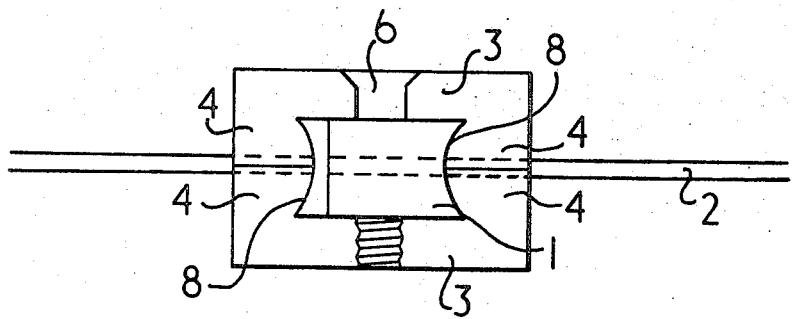
FIG. 3 shows an elevation of an alternative embodiment of the coupling device of the present invention.
Figure 4:
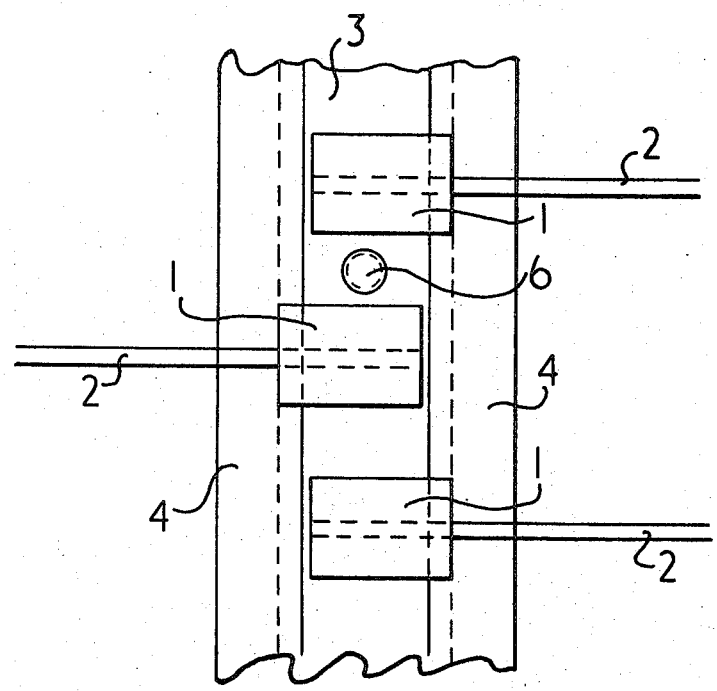
FIG. 4 shows a plan of the embodiment of the invention shown in FIG. 3 with the upper plate of the tie-bar removed.

Instead of each set of nipples 1 being directly opposite one another as in the embodiment shown in FIGS. 1 and 2, they may be staggered as in the embodiment shown in FIGS. 3 and 4. In this way the width of the joint may be significantly reduced. Also the embodiment in FIGS. 3 and 4 illustrates an alternative arrangement for the abutting surfaces of the nipples and flanges where cylindrically concave and convex surfaces 8 replace the "V" shape and wedge shaped surfaces of the embodiment shown in FIGS. 1 and 2.

Figure 5:
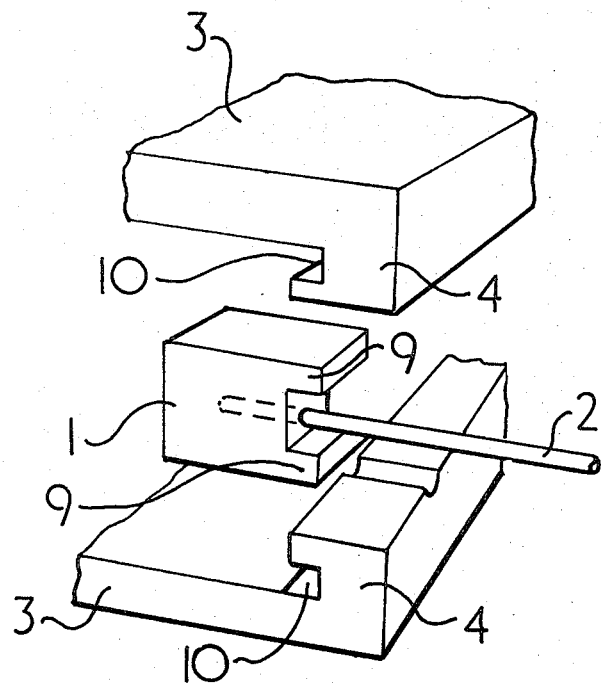
FIG. 5 shows a part exploded view of a further embodiment of the present invention.

FIG. 5 shows yet another embodiment of the coupling device of this invention in which the surface of the nipple 1 which abuts with the flange 4 is provided with locating lugs 9 which engage in grooves 10 in the flanges, and thereby prevent the coupling device from being forced apart when under tension.

Figure 6:
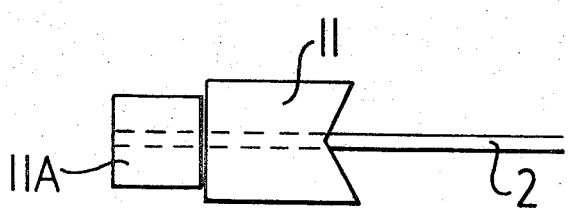
FIG. 6 shows one method of connecting the abutment elements of the present invention to the connecting elements.

FIG. 6 shows one method of fixing the abutment element 11 to the connecting element or wire 2. In this case the abutment element is a collar 11 which is secured on the connecting element 2 by means of a nipple 11A which is swaged onto the end of the connecting element 2, so that when the coupling element is under tension the nipple 11A will abut with the surface of the collar.

Figure 8:
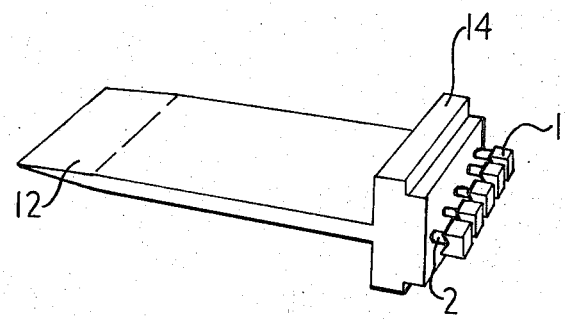
FIG. 8 shows a prefebricated portion of the coupling device.

The coupling device according to this invention may be made integral with the belt carcass or may be prefabricated as shown in FIG. 8. This prefabricated portion includes a set of nipples 1 firmly secured to connecting wires 2 the portion of the connecting wires to be bonded to the belt carcass are covered with a rubber composition 12 which is compatable with the material of the belt. A moulded belt end 14 is also included.

Figure 7:
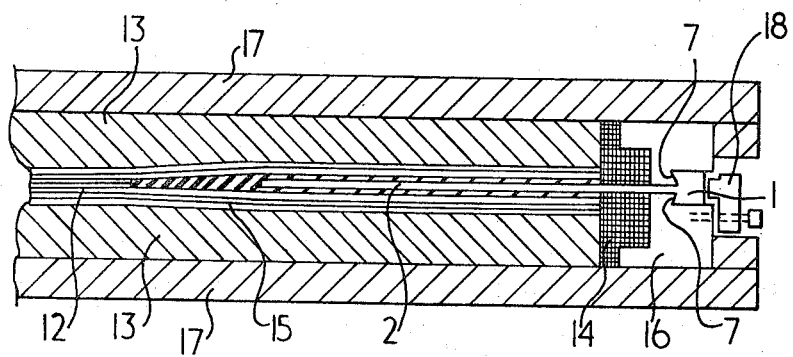
FIG. 7 shows a jig in which the belt with coupling device may be fabricated.

Whether the coupling device is made integral with the belt carcass or prefabricated, in order to ensure accurate alignment of the nipples 4 a jig 16, corresponding in cross-section to the tie-bar as shown in FIG. 7 may be used. A thrust pad may be used to ensure the nipples are held firmly against the jig 16 while fabrication is taking place.

Figure 9A:
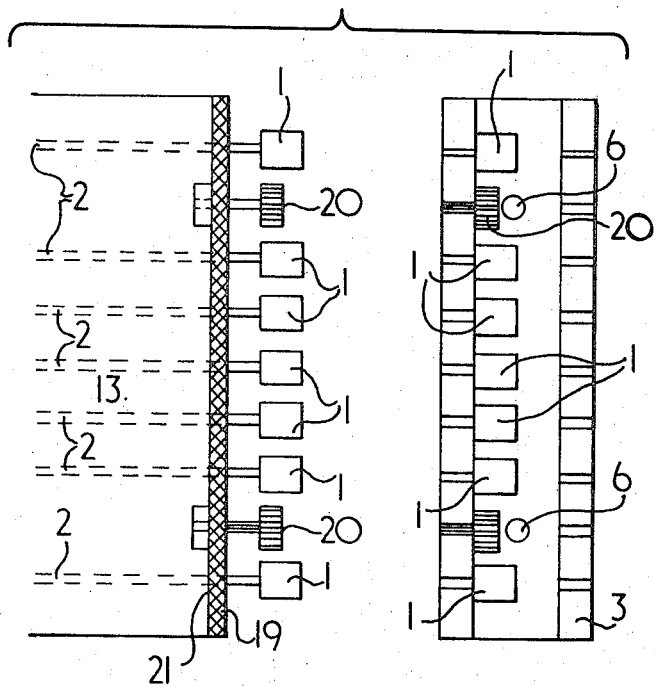
FIGS. 9 and 9A show cross-sectional and plan views, respectively, of one method by which the coupling device may be sealed to the belt.
Figure 9:
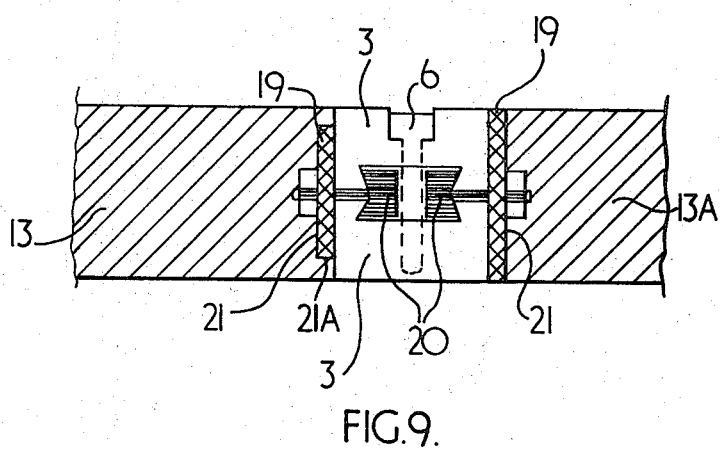

FIGS. 9 and 9A show one arrangement by which the coupling device may be sealed to the belt end thereby preventing the ingress of dirt, water or other corrosive materials into the joint. A metal bar 19, having holes through which connecting elements may pass into the belt carcass (13,13A), is bonded to the belt carcass (13,13A) along the end face 21. This bar 19 may be the full thickness of the belt as shown at 21 or may be inset from the surface of the belt as shown at 21A. The joint is made in the way previously described, i.e., by clamping nipples 1 between the flanges of plates 3 which form the tie-bar. In addition the bar 19 is held in close contact with the tie-bar by the additional nipples 20 which are permanently fixed to the bar 19. Thus as the joint is flexed the bar 19 is held firmly against the tie-bar to maintain a close seal between the belt and tie-bar.

Figure 10:
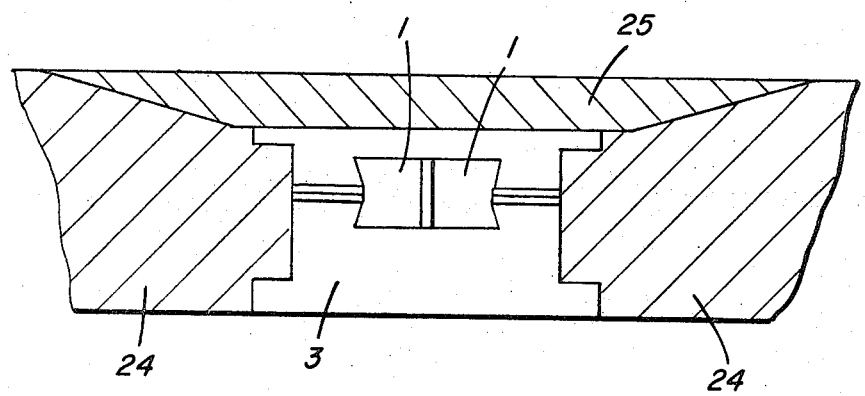
FIG. 10 is a sectional view showing a coupling insert below the surface of the belt and covered by an insert of belting material.
Figure 11:
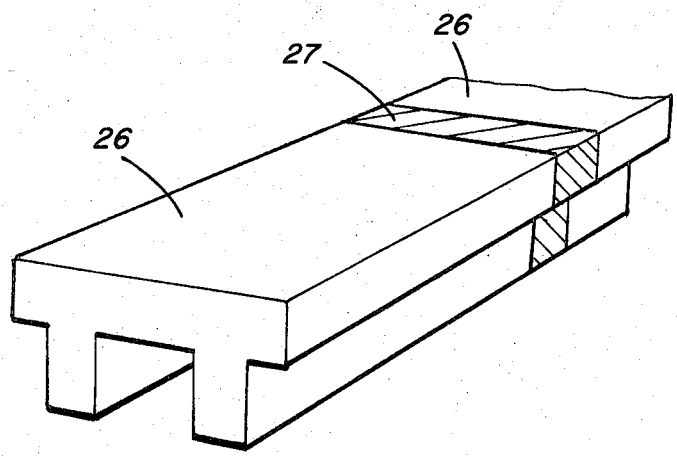
FIG. 11 is a perspective view of a coupling having transverse segments connected by a flexible material.

FIG. 10 shows a coupling having nipples 1 in plates 3 constituting a coupling which has been inset below the surface of the belting material 24 and has an insert 25 of the same belting material of generally wedged shaped configuration fitting over it. As previously stated the tie-bar and abutment elements may be made transversely flexible by using sets of bars or using continuous bars and tie-bars which are divided into segments connected by or imbedded in flexible material such as rubber. This embodiment is shown in FIG. 11 where a plate 26 is divided into segments which are connected by a flexible material 27 so as to be transversely flexible.

Having now described my invention, what I claim is:

1. Apparatus for coupling two belt ends together, comprising:
a first abutment member secured to a first belt end and having a V-shaped surface portion facing said first belt end, the point of the V facing away from said first belt end;
a second abutment member secured to a second belt end and having a V-shaped surface portion facing said second belt end, the point of the V-shaped surface of the second member facing away from said second belt end;

a first tie-bar member having first and second surface portions complementary to and engaging one leg of each of the V-shaped surfaces of said first and second abutment members, respectively; and a second tie-bar member having first and second surface portions complementary to and engaging the other legs of the V-shaped surfaces of said first and second abutment members, respectively;

wherein oppositely directed tension forces produced in said abutment members act to clamp said tie-bar members and said abutment members together.

2. The apparatus according to claim 1, wherein said first and second abutment members each comprises a plurality of similarly shaped members spaced apart across the widths of and secured to said first and second belt ends, respectively.

3. The apparatus according to claim 2, further comprising means for rigidly securing said first and second tie-bar members together.

4. The apparatus according to claim 1, further comprising means to clamp said tie-bars to said belt ends to seal the joints between said tie-bars and said belt ends.

5. The apparatus according to claim 4, wherein said clamping means comprises metal bars sealed to said belt ends and further abutment members secured to said metal bars and engaging said tie-bars to clamp said tie-bars to said metal bars.

6. The apparatus according to claim 1, wherein said abutment members are spaced from their respective belt ends and secured thereto by flexible connecting members.

7. Apparatus for coupling two belt ends together, comprising:

a first abutment member secured to a first belt end and having a substantially U-shaped surface portion facing said first belt end such that the legs of the U extend in the direction of said first belt end;

a second abutment member secured to a second belt end and having a substantially U-shaped surface portion facing said second belt end such that the legs of the U of said second abutment member extend in the direction of said second belt end;

a first tie-bar member having oppositely facing substantially J-shaped first and second surface portions complementary to and engaging one leg of the U-shaped surfaces of said first and second abutment members, respectively;

a second tie-bar member having oppositely facing substantially J-shaped first and second surface portions complementary to and engaging the other leg of the U-shaped surfaces of said first and second abutment members, respectively;

wherein oppositely directed tension forces produced in said abutment members act to clamp said tie-bar members and said abutment members together.

8. Apparatus for coupling two belt ends together, comprising:

a first abutment member secured to a first belt end and having a concave surface portion facing said first belt end such that the center of curvature of said concave surface portion extends in the direction of said first belt end;

a second abutment member secured to a second belt end and having a concave surface portion facing said second belt end such that the center of curvature of the concave surface portion of said second member extends in the direction of said second belt end; and first and second tie-bar members, each having first and second convex surface portions complementary to and engaging the concave surfaces of said first and second abutment members, respectively;

wherein oppositely directed tension forces produced in said abutment members act to clamp said tie-bars and said abutment members together.

* * * * *